(12) United States Patent
Komori et al.

(10) Patent No.: US 7,050,974 B1
(45) Date of Patent: May 23, 2006

(54) ENVIRONMENT ADAPTATION FOR SPEECH RECOGNITION IN A SPEECH COMMUNICATION SYSTEM

(75) Inventors: Yasuhiro Komori, Kawasaki (JP); Masayuki Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 187 days.

(21) Appl. No.: 09/661,394

(22) Filed: Sep. 13, 2000

(30) Foreign Application Priority Data

Sep. 14, 1999 (JP) .................... 11-260760

(51) Int. Cl.
*G10L 15/14* (2006.01)

(52) U.S. Cl. .................. 704/256; 704/246; 704/236; 379/67.1

(58) Field of Classification Search ........... 704/246, 704/256, 231, 247, 270, 270.1, 233, 260, 704/275, 230, 250, 255, 236; 379/67.1
See application file for complete search history.

(56) References Cited

U.S. PATENT DOCUMENTS

| | | | |
|---|---|---|---|
| 4,385,359 A * | 5/1983 | Watari et al. ............. 704/231 |
| 4,907,274 A * | 3/1990 | Nomura et al. ........... 704/270 |
| 4,922,538 A * | 5/1990 | Tchorzewski .............. 704/247 |
| RE34,536 E * | 2/1994 | Frimmel, Jr. ............. 379/67.1 |
| 5,293,588 A * | 3/1994 | Satoh et al. ............. 704/233 |
| 5,553,119 A * | 9/1996 | McAllister et al. ...... 704/270.1 |
| 5,749,068 A * | 5/1998 | Suzuki .................. 704/233 |
| 5,774,628 A * | 6/1998 | Hemphill ................ 704/256 |
| 5,787,396 A | 7/1998 | Komori et al. ........... 704/256 |
| 5,797,116 A | 8/1998 | Yamada et al. ........... 704/10 |
| 5,802,251 A | 9/1998 | Cohen et al. |
| 5,812,975 A | 9/1998 | Komori et al. ........... 704/256 |
| 5,845,047 A | 12/1998 | Fukada et al. .......... 395/2.77 |
| 5,953,700 A | 9/1999 | Kanevsky et al. |
| 5,956,679 A | 9/1999 | Komori et al. .......... 704/256 |
| 5,956,681 A * | 9/1999 | Yamakita .............. 704/260 |
| 5,956,683 A | 9/1999 | Jacobs et al. |
| 5,970,445 A | 10/1999 | Yamamoto et al. ....... 704/230 |
| 5,970,446 A * | 10/1999 | Goldberg et al. ........ 704/233 |
| 5,987,416 A * | 11/1999 | Matsumoto .............. 704/275 |
| 6,058,365 A * | 5/2000 | Nagai et al. ............ 704/256 |
| 6,076,061 A | 6/2000 | Kawasaki et al. ........ 704/270 |
| 6,108,628 A | 8/2000 | Komori et al. .......... 704/256 |
| 6,223,161 B1 * | 4/2001 | Schliwa ................ 704/247 |
| 6,263,202 B1 * | 7/2001 | Kato et al. ............ 704/246 |

(Continued)

FOREIGN PATENT DOCUMENTS

EP    0671721 A2    9/1995

(Continued)

OTHER PUBLICATIONS

Derwent ("Robust speech recognition method in noisy environments", Goldberg et al, 1st Abstract US Patent 5,970,446).*

(Continued)

*Primary Examiner*—Vijay B. Chawan
(74) *Attorney, Agent, or Firm*—Fitzpatrick, Cella, Harper & Scinto

(57) ABSTRACT

A speech communication system comprising a speech input terminal and a speech recognition apparatus which can communicate with each other through a wire or wireless communication network wherein the speech input terminal comprises speech input unit, a unit for creating environment information for speech recognition, which is unique to the speech input terminal or represents its operation state, and a communication control unit for transmitting the environment information to the speech recognition apparatus, and the speech recognition apparatus executes speech recognition processing on the basis of the environment information.

22 Claims, 2 Drawing Sheets

U.S. PATENT DOCUMENTS

| | | |
|---|---|---|
| 6,522,725 B1 | 2/2003 | Kato |
| 6,594,628 B1 | 7/2003 | Jacobs et al. |

FOREIGN PATENT DOCUMENTS

| | | | |
|---|---|---|---|
| GB | 2 082 820 | * | 3/1982 |
| GB | 2316575 | | 2/1998 |
| GB | 2 323 694 | * | 9/1998 |
| GB | 2323694 | | 9/1998 |
| JP | 04-318900 | * | 11/1992 |
| JP | 06-124097 | * | 5/1994 |
| JP | 06-149290 | * | 5/1994 |
| JP | 07-092989 | * | 4/1995 |
| JP | 7-175495 | | 7/1995 |
| JP | 7-210190 | | 8/1995 |
| JP | 9-507105 | | 7/1997 |
| JP | 11-38992 | | 2/1999 |
| JP | 11-175091 | | 7/1999 |
| JP | 11-205451 | | 7/1999 |
| JP | 2001-067094 | * | 3/2001 |
| JP | 2001-086239 | * | 3/2001 |

OTHER PUBLICATIONS

"Flexible Speech Recognition", Furui, 4th European Conference on Speech Communication and Technology, Madrid, Spain, Sep. 18-21, 1995, pp. 1595-1603.

* cited by examiner

ENVIRONMENT ADAPTATION FOR SPEECH RECOGNITION IN A SPEECH COMMUNICATION SYSTEM

FIELD OF THE INVENTION

The present invention relates to a speech input terminal, speech recognition apparatus, speech communication system, and speech communication method, which are used to transmit speech data through a communication network and execute speech recognition.

BACKGROUND OF THE INVENTION

A speech communication system is proposed, in which speech data is sent from a speech input terminal such as a portable telephone to a host server through a communication network, and processing for retrieval of specific information and the like are executed. In such a speech communication system, since data can be transmitted/received by speech, operation can be facilitated.

However, speech data fluctuate depending on the characteristics of a speech input terminal such as a portable telephone itself, the surrounding environment, and the like, and hence satisfactory speech recognition may not be performed.

In addition, since communication is performed under the same communication conditions under many circumstances, high communication efficiency cannot always be ensured.

SUMMARY OF THE INVENTION

The present invention has been made in consideration of the situation associated with a speech input terminal, and has as its object to provide a speech input terminal, speech recognition apparatus, speech communication system, and control method which can implement optimal speech recognition or communication.

According to an aspect of the present invention, a model for environment adaptation for speech recognition is created by a speech input terminal. A speech recognition apparatus can execute speech recognition processing for speech data based on the model.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

Preferred embodiments of the present invention will now be described in detail in accordance with the accompanying drawings.

Figure 1:
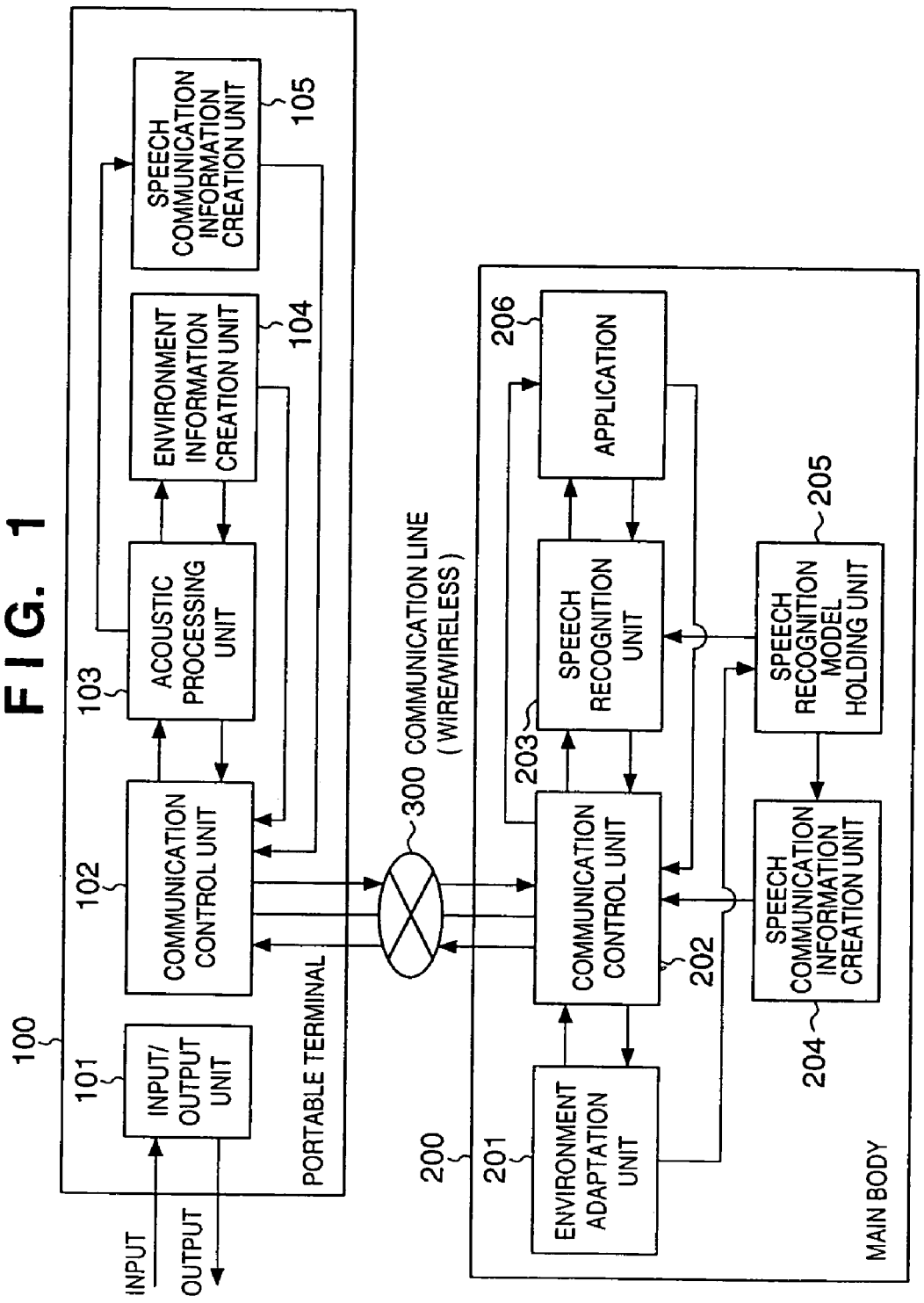
FIG. 1 is a block diagram showing the arrangement of a speech communication system according to an embodiment of the present invention.

FIG. 1 is a block diagram showing the arrangement of a speech communication system according to an embodiment of the present invention.

The speech communication system is comprised of a portable terminal 100 serving as a speech input terminal, a main body 200 serving as a speech recognition apparatus, and a communication line 300 for connecting these components to allow them to communicate with each other.

The portable terminal 100 includes an input/output unit 101 for inputting/outputting speech, a communication control unit 102 for executing communication processing with the main body 200, an acoustic processing unit 103 for performing acoustic processing for the input speech, an environment information creation unit 104 for creating information unique to the portable terminal 100 or information indicating its operation state (to be referred to as environment information hereinafter in this embodiment), and a speech communication information creation unit 105.

The main body 200 includes an environment adaptation unit 201 for performing processing based on the environment information of the portable terminal 100, a communication control unit 202 for executing communication processing with the portable terminal 100, a speech recognition unit 203 for executing speech recognition processing for speech data from the portable terminal 100, a speech communication information creation unit 204 for setting data conversion conditions for communication, a speech recognition model holding unit 205, and an application 206.

Figure 2:
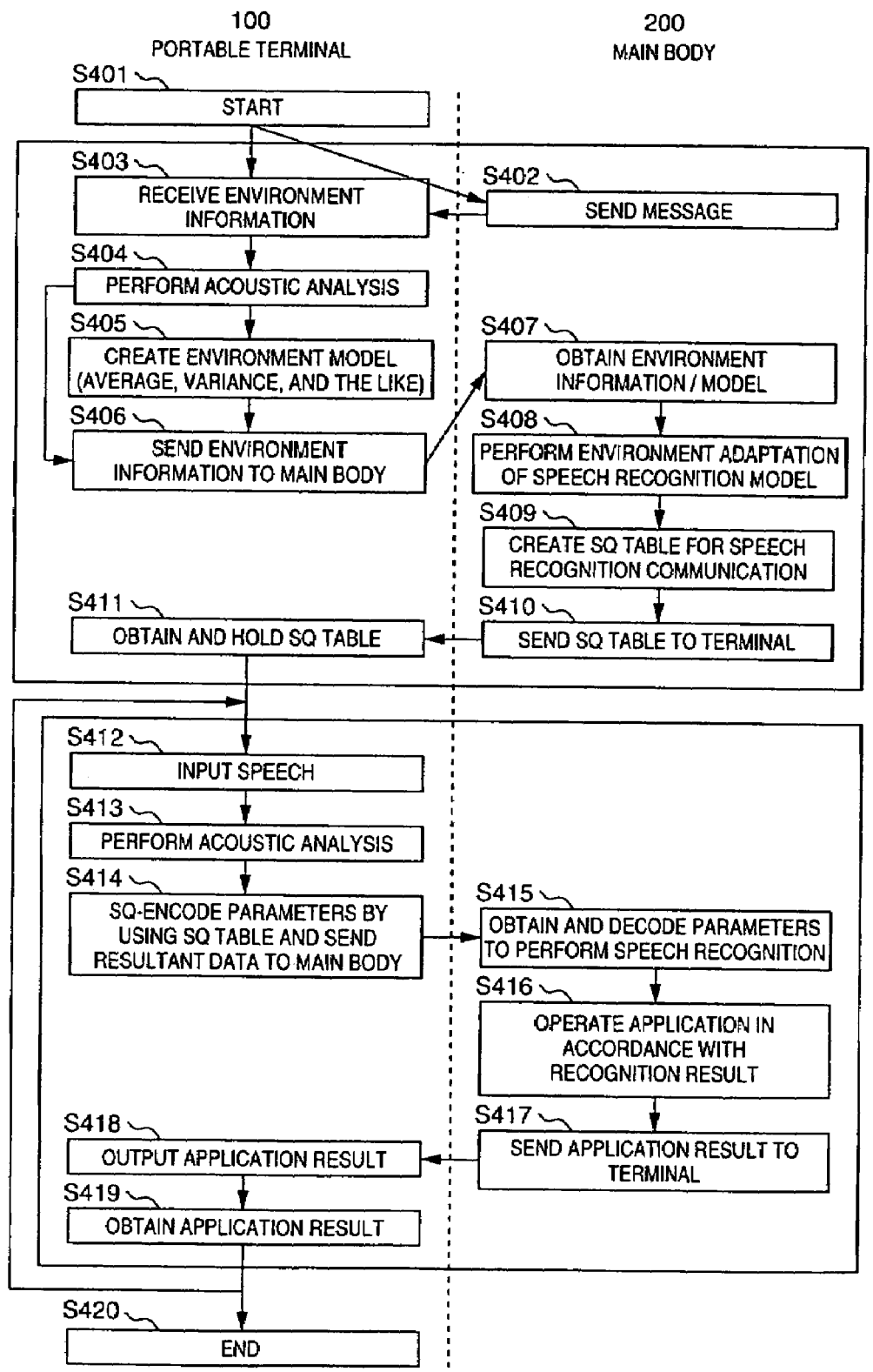
FIG. 2 is a flow chart showing the processing performed by the speech communication system according to the embodiment.

The sequence of operation of the speech communication system having the above arrangement will be described next with reference to FIG. 2. FIG. 2 is a flow chart showing the processing performed by the speech communication system.

The processing performed by the speech communication system is constituted by an initialization mode of analyzing environment information and a speech recognition mode of communicating speech data.

In step S401, all processes are started. Information for the start of processing is sent from the input/output unit 101 to the communication control unit 202 of the main body 200 through the communication control unit 102.

In step S402, a message is selectively sent from the speech recognition unit 203 or application 206 to the portable terminal 100. When, for example, supervised speaker adaptation based on environment information is to be performed, a list of contents to be read aloud by a user is sent and output as a message (speech or characters) from the input/output unit 101 of the portable terminal 100. When microphone adaptation based on environment information is to be performed, information for prompting the utterance of speech for a few seconds may be output as a message from the input/output unit 101 of the portable terminal 100. On the other hand, when noise adaptation based on environment information is to be performed, step S402 may be skipped.

In step S403, speech data (containing noise) is entered from the input/output unit 101 to create environment information in the portable terminal portable terminal 100.

In step S404, the acoustic processing unit 103 acoustically analyzes the entered speech data. If the environment information is to be converted into a model (average, variance, or phonemic model), the information is sent to the environment information creation unit 104. Otherwise, the acoustic analysis result is sent from the communication control unit 102 to the main body. Note that the speech data may be directly sent without performing any acoustic analysis to the main body to be subjected to analysis and the like on the main body 200 side.

When the environment information is converted into a model in step S404, the flow advances to step S405 to cause the environment information creation unit 104 to create environment information. For the purpose of noise adaptation, for example, environment information is created by detecting a non-speech interval and obtaining the average and variance of parameters in the interval. For the purpose of microphone adaptation, environment information is created by obtaining the average and variance of parameters in a speech interval. For the purpose of speaker adaptation, a phonemic model or the like is created.

In step S406, the created environment information model, acoustic analysis result, or speech is sent from the communication control unit 102 to the main body 200.

In step S407, the main body 200 receives sent the environment information through the communication control unit 202.

In step S408, the environment adaptation unit 201 performs environment adaptation with respect to a speech recognition model in the speech recognition model holding unit 205 on the basis of the environment information to update the speech recognition model into an environment adaptation speech recognition model. This model is then held by the speech recognition model holding unit 205.

As a method for environment adaptation, for example, a PMC technique can be used, which creates an environment adaptation speech recognition model from a noise model and speech recognition model. In the case of microphone adaptation, for example, a CMS technique can be used, which creates an environment adaptive speech recognition model by using the average of speech for adaptation and a speech recognition model.

In the case of speaker adaptation, for example, a method of creating a speaker adaptation model by using a speaker adaptation model and speech recognition model can be used. If a speech or acoustic analysis result is sent instead of an environment information model, a method of converting environment information into a model and further performing adaptation on the main body 200 side can be used. Alternatively, a method of performing environment adaptation by directly using a speech or acoustic analysis result, EM learning technique, VFS speaker adaptation technique, or the like can be used as an environment adaptation method. Creating an environment adaptive speech recognition model can improve recognition performance.

Obviously, a speech recognition model may be created on the portable terminal 100 side and sent to the main body 200 to be used.

In step S409, in order to improve the communication efficiency of speech recognition, the speech communication information creation unit 204 performs environment adaptation for a table for the creation of communication speech information. A method of creating a scalar quantization table of parameters of the respective dimensions which are used for speech recognition by using the distribution of environment adaptive speech recognition models will be described below. As this method, various methods can be used, some of which follow. The simplest method is a method of searching 3σ of the respective dimensions for the maximum and minimum values, and dividing the interval therebetween into equal portions.

The number of quantization points may be decreased by a method of merging all distributions into one distribution, searching 3σ (e.g., a range in which most of samples appearing in a Gauss distribution are included) for the maximum and minimum values, and dividing the interval therebetween into equal portions.

As a more precise method, for example, a method of assigning quantization points in accordance with the bias of all distributions may be used. In this method, since a scalar quantization table of the respective dimensions is created by using the distribution of environment adaptive speech recognition models, the bit rate for communication can be decreased without degrading the recognition performance, thus allowing efficient communication.

In step S410, the created scalar quantization table is transmitted to the portable terminal 100.

In step 411, the created scalar quantization table is received by the portable terminal 100 and stored in the speech communication information creation unit 105.

With the above operation, the initialization mode is terminated. If a plurality of portable terminals 100 are present, the main body 200 can store data such as environment information, speech recognition models, and quantization tables in units of portable terminals.

The flow then shifts to the speech recognition mode.

In step S412, speech is input through the input/output unit 101.

In step S413, the input speech data is acoustically analyzed by the acoustic processing unit 103, and the resultant data is sent to the speech communication information creation unit 105.

In step S414, the speech communication information creation unit 105 performs scalar quantization of the acoustic analysis result on the speech data by using a scalar quantization table, and encodes the data as speech communication information. The encoded speech data is transmitted to the main body 200 through the communication control unit 102.

In step S415, the main body 200 causes the speech recognition unit 203 to decode the received speech data, execute speech recognition processing, and output the recognition result. Obviously, in this speech recognition processing, the previously created speech recognition model is used.

In step S416, the speech recognition result is interpreted by the application 206 to operate the application in accordance with the result, and the application result is sent to the communication control unit 202.

In step S417, the application result is sent to the portable terminal 100 through the communication control unit 202 of the main body 200.

In step S418, the portable terminal 100 receives the application result through the communication control unit 102.

In step S419, the portable terminal 100 outputs the application result from the input/output unit 101. When speech recognition is to be continued, the flow returns to step S412.

In step S420, the communication is terminated.

As described above, in the speech communication system of this embodiment, since speech recognition is performed by using a speech recognition model that adapts to the environment information of the portable terminal 100, optimal speech recognition can be executed in correspondence with each portable terminal. In addition, since communication conditions are set on the basis of environment information, communication efficiency can be improved in correspondence with each portable terminal.

In this embodiment, in the case of noise, the average and variance of parameters in a noise interval are obtained and sent to the main body to perform noise adaptation of a speech recognition model by the PMC technique. Obviously, however, another noise adaptation method can be used. In addition, according to the method described above, an average and variance are obtained on the terminal side and transmitted. However, speech information may be sent to the main body side to obtain an average and variance so as to perform noise adaptation.

With regards to microphone characteristics, this embodiment has exemplified the method of obtaining the average and variance of parameters in a speech interval of a certain duration, sending them to the main body, and performing microphone characteristic adaptation of a speech recognition model by the CMS technique. Obviously, however, another microphone characteristic adaptation method can be used. In addition, according to the method described above, an average and variance are obtained on the terminal side and transmitted. However, speech information may be sent to the main body side to obtain an average and variance so as to perform noise adaptation.

This embodiment has exemplified the speaker adaptation method of creating a simple phonemic model representing user's speech features in advance, sending it to the main body, and performing speaker adaptation of a speech recognition model. However, speech information may be sent to the main body side to perform speaker adaptation by using speech on the main body side. Obviously, in this case as well, other various speaker adaptation methods can be used.

In this embodiment, noise adaptation, microphone adaptation, and speaker adaptation are described independently. However, they can be properly combined and used.

In this embodiment, the initialization mode is to be performed before the speech recognition mode. Once the initialization mode is completed, however, speech recognition can be resumed from the speech recognition mode under the same environment. In this case, the previous environment information is stored on the portable terminal 100 side, and environment information created in resuming speech recognition is compared with the stored information. If no change is detected, the corresponding notification is sent to the main body 200, or the main body 200 performs such determination on the basis of the sent environment information, thus executing speech recognition.

In this embodiment, environment information is used for both speech recognition processing and an improvement in speech efficiency. Obviously, however, only one of these operations may be executed by using the environment information.

Although the preferred embodiment of the present invention has been described above, the objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus. In this case, the program code itself read out from the storage medium realizes the functions of the above-mentioned embodiments, and the storage medium which stores the program code constitutes the present invention. The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As many apparent widely different embodiments of the present invention can be made without departing from the spirit and scope thereof, it is to be understood that the invention is not limited to the specific embodiments thereof except as defined in the claims.

What is claimed is:

1. A speech input terminal in a speech communication system comprising said speech input terminal for transmitting inputted speech data to a speech recognition apparatus through a network, and said speech recognition apparatus executing speech recognition processing for the speech data transmitted from said speech input terminal, said speech input terminal comprising:

speech receiving means for receiving speech data from speech input means;

creating means for creating a model based on information representing an operation environment, the model being for environment adaptation for speech recognition in said speech recognition apparatus; and communication means for transmitting the model and the speech data to said speech recognition apparatus and for receiving the results of the speech recognition executed on the basis of the model by said speech recognition apparatus.

2. The terminal according to claim 1, wherein the model indicates at least one of a characteristic of said speech input means, a noise characteristic, and a speaker characteristic.

3. The terminal according to claim 1, further comprising means for quantizing the speech data using a quantization table before transmitting the speech data to said speech recognition apparatus, the quantization table being received from said speech recognition apparatus.

4. The terminal according to claim 1, further comprising:
   means for storing the model;
   means for determining whether there has been a change in the model in each transmitting of the speech data; and
   means for notifying said speech recognition apparatus of the corresponding model, when there has been no change in the model.

5. The terminal according to claim 1, wherein the model is an average or variance of the captured information.

6. A speech recognition apparatus in a speech communication system comprising a speech input terminal for transmitting inputted speech data to said speech recognition apparatus through a network, and said speech recognition apparatus executing speech recognition processing for the speech data transmitted from said speech input terminal, said speech recognition apparatus comprising:

speech recognition means for executing speech recognition processing for the speech data transmitted from said speech input terminal through the network; and means for receiving a model for environment adaptation for speech recognition from said speech input terminal, the model being created by said speech input terminal based on information representing an operation environment thereof, wherein said speech recognition means executes speech recognition processing on the basis of the model.

7. The apparatus according to claim 6, further comprising means for creating an environment adaptation speech recognition model on the basis of the received model.

8. The apparatus according to claim 7, wherein said speech communication system comprises a plurality of speech input terminals and
said apparatus further comprises means for storing the environment adaptation speech recognition model in correspondence with each of said speech input terminals.

9. The apparatus according to claim 7,
wherein said speech input terminal quantizes the speech data using a quantization table before transmitting the speech data to said speech recognition apparatus, and
wherein said apparatus further comprises:
means for creating the quantization table based on the environment adaptation speech recognition model, and
means for transmitting the quantization table to said speech input terminal.

10. The apparatus according to claim 9, wherein said speech communication system comprises a plurality of speech input terminals and
said apparatus further comprises means for storing the quantization table in correspondence with each of said speech input terminals.

11. The apparatus according to claim 9, wherein the quantization table is created based on the distribution of the environment adaptation speech recognition model.

12. The apparatus according to claim 6, wherein said speech communication system comprises a plurality of speech input terminals and
said apparatus further comprises means for storing the model in correspondence with each of said speech input terminals.

13. A speech communication system comprising a speech input terminal for transmitting inputted speech data to a speech recognition apparatus through a network, and said speech recognition apparatus executing speech recognition processing for the speech data transmitted from said speech input terminal,
wherein said speech input terminal comprises speech receiving means for receiving speech data from speech input means, creating means for creating a model based on information representing an operation environment, the model being for environment adaptation for speech recognition in said speech recognition apparatus, and communication means for transmitting the model and the speech data to said speech recognition apparatus and for receiving the results of the speech recognition executed on the basis of the model by said speech recognition apparatus, and
wherein said speech recognition apparatus comprises means for executing speech recognition processing on the basis of the model.

14. The speech communication system according to claim 13,
wherein said speech input terminal quantizes the speech data using a quantization table before transmitting the speech data to said speech recognition apparatus, and
wherein said speech recognition apparatus further comprises means for creating an environment adaptation speech recognition model on the basis of the received model, means for creating the quantization table based on the environment adaptation speech recognition model, and means for transmitting the quantization table to said speech input terminal.

15. A control method in a speech communication system comprising a speech input terminal transmitting inputted speech data to a speech recognition apparatus through a network, and the speech recognition apparatus executing speech recognition processing for the speech data transmitted from the speech input terminal, said method comprising:
a speech receiving step of receiving speech data from speech input means;
a creating step of creating a model in the speech input terminal based on information representing an operation environment, the model being for environment adaptation for speech recognition in the speech recognition apparatus; and
a communication step of transmitting the model and the speech data from the speech input terminal to the speech recognition apparatus and of receiving the results of the speech recognition executed on the basis of the model by the speech recognition apparatus.

16. A control method in a speech communication system comprising a speech input terminal transmitting inputted speech data to a speech recognition apparatus through a network, and the speech recognition apparatus executing speech recognition processing for the speech data transmitted from the speech input terminal, said method comprising:
a step of receiving a model for environment adaptation for speech recognition from the speech input terminal, the model being created by the speech input terminal based on information representing an operation environment thereof; and
a step of executing, in the speech recognition apparatus, speech recognition processing on the basis of the model.

17. The method according to claim 16,
wherein the speech input terminal quantizes the speech data using a quantization table before transmitting the speech data to the speech recognition apparatus, and
wherein said method further comprises:
a step of creating an environment adaptation speech model on the basis of the received model;
a step of creating the quantization table based on the environment adaptation speech recognition model; and
a step of transmitting the quantization table to the speech input terminal.

18. A control method in a speech communication system comprising a speech input terminal for transmitting inputted speech data to a speech recognition apparatus through a network, and the speech recognition apparatus executing speech recognition processing for the speech data transmitted from the speech input terminal, said method comprising:
a speech receiving step of receiving speech data at the speech input terminal from speech input means;
a creating step of creating a model in the speech input terminal based on information representing an operation environment, the model being for environment adaptation for speech recognition in the speech recognition apparatus;
a step of transmitting the model and the speech data from the speech input terminal to the speech recognition apparatus;
a step of executing, in the speech recognition apparatus, speech recognition processing on the basis of the model; and
a step of transmitting the results of the speech recognition from the speech recognition apparatus to the speech input terminal.

19. The speech communication method according to claim 18, further comprising:
- a step of creating an environment adaptation speech model on the basis of the received model in the speech recognition apparatus;
- a step of creating a quantization table based on the environment adaptation speech recognition model in the speech recognition apparatus;
- a step of transmitting the quantization table from the speech recognition apparatus to the speech input terminal; and
- a step of quantizing the speech data using the quantization table in the speech input terminal before transmitting the speech data from the speech input terminal to the speech recognition apparatus.

20. A storage medium storing a program causing a speech input terminal, in a speech communication system comprising the speech input terminal for transmitting inputted speech data to a speech recognition apparatus through a network, and the speech recognition apparatus executing speech recognition processing for the speech data transmitted from the speech input terminal, to perform the steps comprising:
- receiving speech data from speech input means;
- creating a model based on information representing an operation environment, the model being for environment adaptation for speech recognition in the speech recognition apparatus;
- transmitting the model to the speech recognition apparatus; and
- receiving the results of the speech recognition executed on the basis of the model by the speech recognition apparatus.

21. A storage medium storing a program causing a computer, in a speech communication system comprising a speech input terminal for transmitting inputted speech data to the computer through a network, and the computer executing speech recognition processing for the speech data transmitted from the speech input terminal, to perform the steps comprising:
- receiving a model for environment adaptation for speech recognition from the speech input terminal, the model being created by the speech input terminal based on information representing an operation environment thereof; and
- executing speech recognition processing on the basis of the model.

22. The storage medium according to claim 21,
wherein the speech input terminal quantizes the speech data using a quantization table before transmitting the speech data to the computer, and
wherein the steps further comprise:
creating an environment adaptation speech model on the basis of the received model;
creating the quantization table based on the environment adaptation speech recognition model; and
transmitting the quantization table to the speech input terminal.

* * * * *